Jan. 26, 1971 W. S. BARNES 3,559,170
METHODS AND APPARATUS FOR DATA INPUT TO A COMPUTER
Filed March 7, 1967 6 Sheets-Sheet 1

INVENTOR.
WILLIAM S. BARNES
BY
ATTORNEYS

INVENTOR.
WILLIAM S. BARNES

ATTORNEYS

Jan. 26, 1971      W. S. BARNES      3,559,170

METHODS AND APPARATUS FOR DATA INPUT TO A COMPUTER

Filed March 7, 1967      6 Sheets-Sheet 4

INVENTOR.
WILLIAM S. BARNES

ATTORNEYS

INVENTOR.
WILLIAM S. BARNES

INVENTOR.
WILLIAM S. BARNES
BY
ATTORNEYS

United States Patent Office 3,559,170
Patented Jan. 26, 1971

3,559,170
METHODS AND APPARATUS FOR DATA INPUT TO A COMPUTER
William S. Barnes, 1542 Spruce St., Livermore, Calif. 94550
Filed Mar. 7, 1967, Ser. No. 625,913
Int. Cl. G06k 9/18
U.S. Cl. 340—146.3                                       21 Claims

ABSTRACT OF THE DISCLOSURE

A method of representing numerical information in binary form wherein a plurality of dot patterns are established on a data medium and numerical weighting is given to each dot pattern by selectively joining dot pairs of the pattern with essentially straight lines, and apparatus for reading numerical information in the form set out above including apparatus which utilizes electronic pulses or sensing scanners for interrogating the space between dot pairs which can have lines drawn therebetween in order to determine the numerical weighting of a numerical dot pattern.

BACKGROUND OF THE INVENTION

This invention relates to methods and apparatus for reading characters written or printed in a coded form on a prepared format, and to appartus which interprets these characters as numbers which may be used in calculations by digital computers, or may be used to control the sequence of operations of such computers or other apparatus.

One of the major problems in the use of digital computers and other automatic equipment is in the transcription of alphanumeric data into a form which can be used by or can control the operation of such equipment. Numerous systems have been devised for accomplishing this task. In general these systems are adapted to specific applications and are unsuitable for some of the other applications. These systems may be classified as direct (use of a teletypewriter keyboard, pushbuttons, or switches which feed numbers directly into a computer or other automatic devices) and indirect (use of punched cards or tape, magnetic tape, special alphanumeric symbols on papers, etc., which may be sensed by a data input device of the computer). The indirect means have an advantage over direct means in that the data may be prepared in advance, stored for future use, and, if legible, edited after preparation. For these reasons and others indirect means of data input may be used for masses of data so large and computer programs so long that direct means would be impractical.

The methods now in use for preparing data for input to computers by indirect means have a number of defects that limit their use in various ways. Some methods, such as those which use magnetic tape, punched cards or tape, etc., produce data in a form which is either wholly or partially illegible so far as reading the data by eye is concerned, and supplementary apparatus for reading the data is usually necessary and provided.

In order to overcome the defect of illegibility various character recognition systems have been devised so that data may be presented in an alphanumeric form which may be read directly by a person or alternately by a machine. It is attempted in such systems to present the data in modified versions of the Hindu-Arabic numerals and sometimes in standard alphabetical characters. In these systems, there are varying requirements for precision in both position and shape of the symbols and in the structure and positioning of the reading device used by the machine. In some cases the structure of each symbol must be so formally precise as to necessitate the use of a machine to print it. In others, the requirements for structural precision of the characters are relaxed somewhat but are not eliminated entirely, i.e. there is not yet any system that can unfailingly read any recognizable alphanumeric character. The systems which are used to sense and read such alphanumeric characters vary both in complexity and in the requirements for precision. In general it may be said that the complexity and sophistication of such systems increases with a decrease in the requirements for precision in writing the alphanumeric characters to that one pays for an increase in ease of writing the characters by an increase in the complexity of the systems used to read the characters.

The use of such special equipment as keypunches, special typewriters, etc., is frequently indicated by consideration of speed and efficiency in the preparation of data for input to computers. However, there might occur situations in which such equipment might not be available. The preparation of data would also be made easier if parts of it could be erased and modified by hand. In the case of many systems in use today, the requirements for precision are so great that the preparation of data by hand is totally out of the question, and the use of special equipment is absolutely necessary.

The use of numerals having shapes corresponding roughly to the usual shapes of Hindu-Arabic numerals has one other disadvantage. When a number is read into a digital computer, it is represented in the computer by the functional state of a circuit, specifically in digital computers by a state of a circuit consisting of a series of binary flip-flop circuits. A number, which originally was represented by a series of decimal (or quartal, octal, etc.) numerals, must be represented in the computer in such a way that arithmetic and other operations may be carried out. One method of representation frequently used is binary coded decimal (or perhaps binary coded quartal, octal, etc.). In this representation each decimal (quartal, octal, etc.) numeral of the original number is represented by a separate binary number. The more usual method is to represent the complete number as a single binary number. The numerical reading systems in use today do not, in general, read Hindu-Arabic numerals into a computer circuit in their binary representation. Each numeral is read into the computer circuit in a representation which depends on its unique structural characteristics and on the read system used. In general, no single algorithm can be used to convert the representations of all of the Hindu-Arabic numerals in such systems into their binary representations. Hence, unique circuit arrangements (or programmatic arrangements) must be made to convert each numeral into its binary representation. If, in additon, it is desired to represent a number written as a series of Hindu-Arabic numerals as a single binary number, a further conversion arrangement is required. In order to avoid the disadvantages mentioned above, numerals and conventional alphabetic characters are not used in this invention, and whatever disadvantages arise from this departure, they are felt to be minor when compared to the advantages, which will be made clear in the description which follows.

SUMMARY OF THE INVENTION

It is an object of this invention to provide methods and apparatus for recording numerical data in the form of symbols which may be read directly by eye, read by a machine, written by hand, printed by a machine, and if necessary manually erased and rewritten. The form of the symbols chosen enables either a single numeral or a multidigit number to be written by the symbols and read directly as a single binary number. The means chosen have the additional advantages that the requirements for precision both in writing the numerals and in the positioning of the sensing elements in the reading means are substantially less than for most existing data reading systems. Since the numbers may be read directly as binary numbers, the use of additional equipment for conversion of the numbers being read into binary numbers is avoided. A further outstanding characteristic possessed by the symbols used in this invention is that a person of ordinary intelligence will be able to learn how to read and write them with only a few minutes of instruction.

Since the symbols of the present invention are written for the purpose of being read electronically it is necessary to employ one of several possible means for writing the symbols so that they can be electronically detected. One such means is to write or print the symbols with electrically conducting ink or lead in designated positions on a prepared format. Use is then made of the change in electrical conductivity between various points on the format (data medium) produced by these symbols to accomplish the read operation. A second means is to make use of a contrast in some characteristic between the marks comprising the symbols and the background material on which they are written (data medium). For instance, a contrast between light and dark may be detected by a photo-cell or a contrast in magnetic susceptibility, which might occur if the lead or ink contained ferromagnetic materials, might be detected by an electromagnetic reading head.

Another object of the present invention is to provide means by which a row of symbols as set out above may be read into the circuits of a computer or other automatic device as a single binary number and, in the case where a data medium contains many such symbols arrayed in rows or columns, means are provided for selecting a single row or column from this array and reading it as a single binary number.

Still a further object of the present invention is to provide means for converting a binary number in the circuits of a computer or other automatic device into binary coded decimal or some other binary coded form.

The various objects set out above are accomplished primarily by adopting a numeral representation system as taught by the present invention. A data medium (format) is prepared so as to have a plurality of dot patterns established thereon wherein each dot pattern is substantially identical and includes three or more dots. By assigning values to given dot pairs of a given dot pattern, and weighting a given dot pattern with the assigned value when a line is drawn between that dot pair, it becomes possible to represent one of several numerals on a single dot pattern by drawing substantially straight lines between the appropriate dot pairs.

In addition to the particular convention described above the present invention teaches electronic systems for reading directly as binary numbers the numerals in the form suggested above. Primarily this includes generating trains of pulses which are directed sequentially to the space between the several dot pairs of a given dot pattern to determine whether or not a line has been drawn between those dots, and thus whether or not the particular dot pattern should be given the numerical weighting which is represented by that dot pair. An alternate form of the reading portion of the present invention includes a scanning system wherein a pulse is generated each time the scanning mechanism encounters a line between a dot pair, and by using control marks on the format together with the straight lines disposed between dot pairs, it is possible to give a proper weighting to the particular straight line giving rise to a pulse from the scanner.

The invention also teaches several specialized systems which highlight the functional capabilities of a system adopting the numerical form taught by the present invention.

BRIEF DESCRIPTION OF THE DRAWINGS

FIGS. 1 and 2 illustrate systems of numerals written in the dot pattern form of the present invention; FIG. 1 showing a three dot convention and FIG. 2 a four dot convention;

DESCRIPTION OF THE PREFERRED
EMBODIMENTS

Numbers are usually written as a linear sequence of numerals $a_n a_{n-1} \ldots a_2 a_1 a_0$. When a number is written in this way, the $a_i$ are referred to as digits. When the Hindu-Arabic numerals are used, each $a_i$ is one of the set of symbols 0, 1, 2, 3, 4, 5, 6, 7, 8, and 9. The value of a number written as such a sequence of digits is taken to be $$a_n \cdot b^n + a_{n-1} \cdot b^{n-1} + \ldots + a_2 \cdot b^2 + a_1 \cdot b + a_0$$

Here $b$ is called the base and $b^n$ is taken to mean $b$ raised to the $n$th power. For instance, the number 5432 (with the base 10 implied) has a value $$5 \cdot 10^3 + 4 \cdot 10^2 + 3 \cdot 10 + 2.$$

For the sake of the discussion $a_0$ will be termed the lowest ranking digit and $a_n$ the highest ranking digit. If $b$ is 10, all the numerals 0 through 9, inclusive, may be used for the $a_i$, and a number so written is called a decimal number. If $b$ is 8, only the numerals 0 through 7, inclusive, may be used for the $a_i$, and a number so written is called an octal number. If $b$ is 2, only the numerals 0 and 1 may be used for the $a_i$, and a number so written is called a binary number. Occasionally it is useful to express each of the $a_i$ as binary numbers even though a base such as 10, 8, etc. is being used. When expressed in such a way, a number is said to be in binary coded decimal, octal, etc. form.

This invention includes a new process for recording data in a form in which it may be easily read by electromechanical devices and, when read by such devices, the data may be fed into the circuits of a computer or other automatic devices in a form which may be used with no additional transcriptions. The process or method consists primarily of the two steps of recording the data in a new system of numerals on preprinted formats (data medium) and the use of one of several electromechanical devices described herein below to read numbers recorded in the new numerals into the circuits of a digital computer in the form of binary numbers.

To record a multi-digit number in the system of the present invention, each digit is written in its binary representation. It is not, however, written in the conventional binary form utilizing zeros and ones but is instead written in a special form and according to the following rules. Each numeral is written on a preprinted format consisting of N dots where N may be 3, 4, 5, etc. depending on the purpose of the particular embodiment of the invention. The numeral is constructed by connecting dots with substantially straight line segments wherein, for most applications, only non-intersecting line segments will be used.

The line segments connecting the different pairs of dots of a given pattern are assigned the values 1, 2, 4, 8, etc. in the read process. The number of dots, their spatial distribution and the assignment of values to the line segments which may connect them is not limited to the particular values suggested above, but in fact will be different in different embodiments to best suit the particular application to which the invention is being put.

Figure 1:
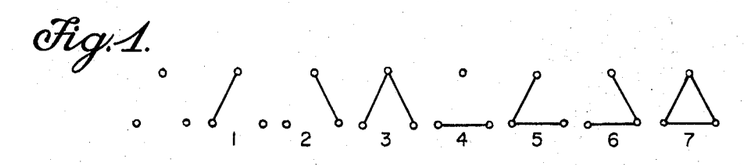
Figure 2:
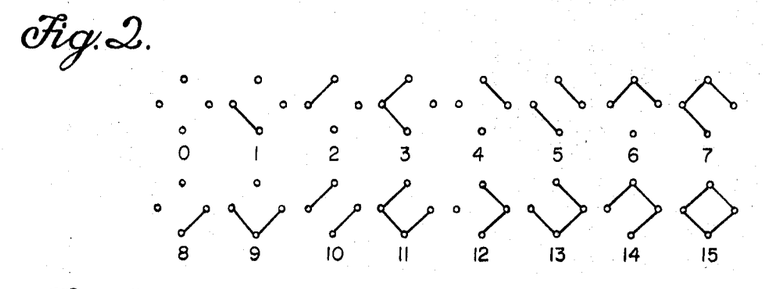

Referring to FIG. 1, a specific example of numerals written in the system of the present invention includes a three dot format with lines connecting dot pairs assigned the values 1, 2 and 4 starting with the line segment on the left side of the format and proceeding clockwise. FIG. 2 illustrates a four dot format wherein the line segments are assigned the values 1, 2, 4 and 8 starting with the line segment on the lower left side of the format and proceeding clockwise with the cross connections not being used. Once again it is to be emphasized that the particular assignment of values suggested above are not unique, and a different assignment of values would not transcend the concept of the present invention. In the case of the three dot format of FIG. 1 there are 3! ($=3 \times 2 \times 1=6$) possible different assignments (combination of dot connecting line segments), and in the case of the four dat format there are 4! possible different assignments. The number of assignments in the case of the four dot format can be further increased by the use of the cross connections which are not utilized in the convention adopted in FIG. 2. The particular assignment of values selected for the examples of FIGS. 1 and 2 were chosen primarily to make it easy to learn the numerical value of a given set of lines in a particular dot pattern. The four dot pattern has the characteristic of having the lowest number of dots giving rise to nine or more possible line segment combinations making this pattern suitable for representing a decimal digit convention.

The following description of the numeral reading systems of the present invention is in terms of basic, standardized, electronic units which are well known to the electronic art and are capable of being physically realized in several forms.

The units which will be referred to below include flip-flop circuits which, as is well known, exist in only one of two possible states when in operation and upon receipt of an impulse flip into the other of its states. In one of its two states it not only responds to an impulse by changing states, but also by transmitting the received impulse to any other circuit with which it happens to be associated; in its other state it blocks the transmission of the received impulse and merely changes state. In conforming with normal practices the two states of the flip-flop circuits will be referred to as the conducting and nonconducting states. Another unit which is referred to below is a register, which comprises a number of flip-flop circuits connected in series so that each transmits its impulse to the next in the series. The particular flip-flop circuits comprising the register are referred to as the first, second, third, etc. stages of the register starting with the first circuit in the series. In many cases special provision is made to place every stage of the register in the same state by means of a single signal. This operation is referred to as resetting the register. In most cases a register is reset such that all of its stages are placed in their nonconducting state, but the present invention employs a resetting signal which is in fact an exception to this practice. In operation, if N pulses are transmitted into a register all of the stages of which were initially in their nonconducting states, then the state of the register may be taken to represent N in binary form with the conducting state of each stage representing the numeral one, the nonconducting state of each stage representing the numeral zero and with the first, second and up through the last stage standing for the lowest ranking, second ranking, and up through the highest ranking digit in the number, respectively.

In describing the present invention reference is made to the overflow of registers. If it is assumed that the exact number N of pulses have been transmitted into a register to cause all of the stages of the register to be in their conducting state, the next pulse transmitted to the register will cause all of the stages thereof to go into their nonconducting states, and if the output of the final stage is connected to another circuit a pulse will be transmitted to that circuit and the register is said to have overflowed. Reference will also be made to the concept of the complement, $C(n)$, of a number $n$ in connection with some registers. Here $C(n)$ is defined as $C(n)=N+1-n$ for a register whose capacity is N. Hence if $n$ pulses are counted into the register, then $C(n)$ pulses are counted into it, the register will overflow.

Another unit which is employed extensively in forming a system for reading numerals of the present invention is referred to as a gate circuit, or simply a gate. A gate circuit has the properties that it transmits a received impulse if it also receives a bias from some other circuits; otherwise it will block the transmission of each impulse. In addition to the units described above, the present invention also makes use of pulsers (oscillators or free-running multivibrators) and delay circuits, both of which are well known in the art, and which in and of themselves form no portion of the novelty of the present invention.

Figure 3:
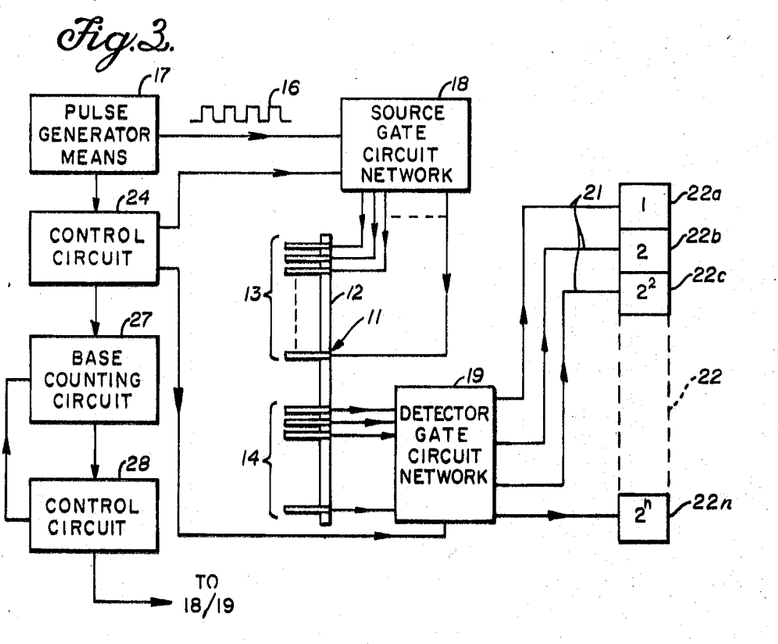
FIG. 3 is a block diagram of an electronic circuit for reading numerals written in the form of FIGS. 1 and 2.

One specific form of realizing the number system of FIG. 2, for example, so as to enable the numerals to be electronically read by a computer or the like, is to have the dots forming the pattern printed with an electrically conductive ink and the straight line segments drawn with electrically conducting ink or lead. FIG. 3 illustrates a system for reading numerals which are realized in this particular specific form.

Referring now to FIG. 3, a reading head 11 comprises a rigid sheet of nonconducting material 12 on which a set of metallic source pins 13 and a set of metallic detector pins 14 are mounted. The pins are distributed over the surface of the nonconducting sheet 12 in such a pattern that at least two pins—one source pin 13 and one detector pin 14—make contact with the preprinted format along the locus of each possible line segment when the format is positioned correctly with respect to the reading head and when the reading head is pressed down upon the data medium.

In reading a numeral of N possible straight line segments, the read circuit employs a sequence of N pulses 16. The pulses 16 emanate from a pulse generator means 17 and are directed to a network of gate circuits 18 which directs one pulse (in a manner to be described in greater detail below) to one of the pins 13 at the locus of each of the various possible line segments which may be used to construct a numeral. If there happens to be a conducting mark connecting a pin 13 to a pin 14, the pulse will pass along that mark to the pins 14 and from there to a detector gate circuit network 19 which directs the pulse to one of several inputs 21 of an accumulator register means 22. If a pulse is passed to a pin 14 due to the presence of a line segment having the assigned value 1, then the detector gate circuit network 19 directs a pulse to the input of register means 22 leading to the first stage 22a thereof. In a similar manner a pulse to the detector gate circuit 19 due to the presence of a line segment having the value 2 results in the detector gate circuit network directing a pulse to the second stage of the accumulator register means 22b; a pulse to the detector gate circuit network 19 by virtue of the presence of a line segment having the assigned value 4 is directed to the third stage of the accumulator 22c; a pulse to the detector gate circuit 19 due to the presence of a line segment having the value $2^n$ is directed to the nth stage of the accumulator 22n. Thus the accumulator 22 is the register into which a number is read in binary form when the read circuit is in operation.

Figures 4, 17:
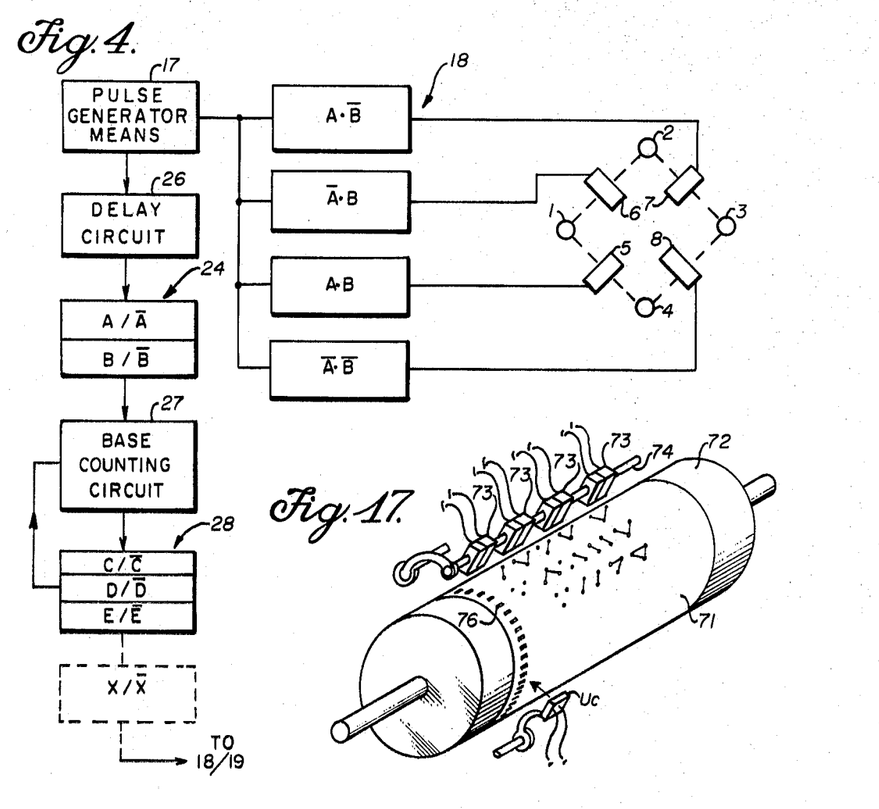
FIG. 4 is an expanded block diagram of the portion of the system of FIG. 3 which directs pulses to the dot patterns on a data medium to interrogate specific dot pairs for connecting lines.
FIG. 17 is a semi-schematic illutsration of a drum with numerical information of the present invention disposed thereon.
Figure 5:
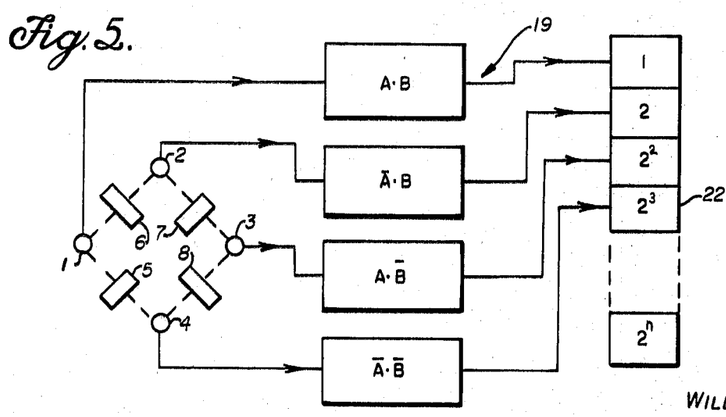
FIG. 5 is an expanded block diagram of the portion of the system of FIG. 3 which receives the information furnished by the pulses directed to a dot pattern and directs that information to an accumulation register means.

FIGS. 4 and 5 illustrate a specific embodiment of a read circuit designed to read numerals written on four dot patterns, such as those of FIG. 2. The circular pins 1, 2, 3 and 4 correspond to the pins 14 of FIG. 3 and make contact with the dots of the preprinted format which, as previously mentioned, are advantageously printed with ink having a high electrical conductivity. The rectangular pins 5, 6, 7 and 8 corresponding to pins 13 of FIG. 3 make contact with the marks, if any, drawn between dot pairs. FIG. 4 illustrates the portion of the read circuit hereinafter referred to as the source circuit, and FIG. 5 illustrates the portion of the read circuit hereinafter referred to as the detector circuit. The source circuit operates to direct pulses sequentially to each of the rectangular pins, while the detector circuit directs pulses which pass from a rectangular pin to a circular pin to the appropriate stage of the accumulator register means 22.

The source circuit (FIG. 4) comprises pulse generator means 17, the source gate circuit network 18 which includes four gate circuits $A \cdot \bar{B}$, $\bar{A} \cdot B$, $A \cdot B$, and $\bar{A} \cdot \bar{B}$, a source gate circuit control circuit 24, which includes a delay circuit 26, and two flip-flop circuits $A/\bar{A}$ and $B/\bar{B}$. The source circuit further includes a base counting circuit 27, which will be described in greater detail below, and a state register control circuit 28 including a series of flip-flop circuits $C/\bar{C}$, $D/\bar{D}$, $E/\bar{E}$, etc. where the number of such circuits depends on the number of digits in the numbers which the circuit is designed to read. The detector circuit (FIG. 5) comprises the detector gate circuit network 19 which includes four gate circuits $A \cdot B$, $\bar{A} \cdot B$, $A \cdot \bar{B}$ and $\bar{A} \cdot \bar{B}$ corresponding to the four gate circuits of the source circuit, and the accumulator register means 22.

The control circuit 24 controls both the gates of source gate circuit network 18 and the gates of detector gate circuit network 19 even though no connection is indicated between these components. The two states of the first stage of circuit 24 are designated by A and $\bar{A}$. In state A, this stage blocks any pulse which is received, while in state $\bar{A}$ it transmits the pulse. The second stage either blocks or transmits the pulse depending on whether it is in its state B or $\bar{B}$, respectively. It is the function of these two stages to control the functioning of the gate circuits in both the source and detector circuits by supplying them with appropriate biases. For example, if the first stage A is in state A it supplies a bias also designated by A to the gate circuits labeled $A \cdot B$ and $A \cdot \bar{B}$; if it is in state $\bar{A}$ it supplies the bias $\bar{A}$ to the gates $\bar{A} \cdot B$ and $\bar{A} \cdot \bar{B}$. A similar function is performed by the second stage. The gate labeled $A \cdot \bar{B}$ only passes a pulse if it receives both the bias A and the bias $\bar{B}$. The labeling of the other gate circuits indicates analogous operation.

For the purposes of the present invention the nonconducting states of the stages of the accumulator register means 22 are taken to have the value zero, while the conducting states of the individual stages are taken to have the values 1, 2, 4, 8, 16, etc. starting with the first stage in the series. When the numeral being read has a four dot pattern, and where neither intersecting nor diagonal lines are assigned numerical values, a sequence of four pulses from pulse generator means 17 is required to read one numeral. Just prior to the first pulse being issued from the pulse generator means 17 (at the start of the read operation) the two stages of the control circuit 24 are in states A and B, respectively. Thus, the first pulse from generator 17 passes through source circuit gate $A \cdot B$ to rectangular pin 5. If a line is drawn between the dots which are contacted by pins 1 and 4, then the pulse will travel to pin 1 and from there through the detector circuit gate $A \cdot B$ into the first stage of the accumulator 22. The first pulse also passes through the delay circuit 26 to the control circuit 24 and flips the first flip-flop thereof from state A to state $\bar{A}$. When the state register flips from A to $\bar{A}$ the only source circuit gate which can pass a pulse changes from $A \cdot B$ to $\bar{A} \cdot B$, such that the second pulse from pulse generator means 17 interrogates the space between the dots contacted by pins 1 and 2, and if a mark is detected, a pulse is directed from pin 2 through the gate $\bar{A} \cdot B$ of the detector gate circuit network to the second stage of the accumulator register 22. The second pulse also passes to the delay circuit 26, after which it operates to change the first stage of the state register back to A, and the second stage to $\bar{B}$.

Columns 1 and 2 of Table 1 below summarize the sequence of events described above, while columns 3 and 4 summarize the subsequent series of events in the read operation for the third and fourth pulses.

Several variations of the circuit arrangement of FIGS. 4 and 5 are possible and bear mentioning at this time. In one such variation the detector circuit gate circuit $A \cdot B$ and $\bar{A} \cdot \bar{B}$ may both be connected to pin 4, and the detector gates $\bar{A} \cdot B$ and $A \cdot \bar{B}$ may both be connected to pin 2. This is true since a pulse at pin 2 will be directed to the proper stage of the register by virtue of the control effected by the detector gate circuit network, such that the particular direction of travel of a pulse along a line connecting two dots is not a factor which is employed by the system. In another variation, detector gates $A \cdot B$ and $\bar{A} \cdot B$ may both be connected to pin 1 and the detector gates $A \cdot \bar{B}$ and $\bar{A} \cdot \bar{B}$ may both be connected to pin 3. In any of these

TABLE 1

| Pulse number | 1 | 2 | 3 | 4 |
|---|---|---|---|---|
| goes through source gate | $A \cdot B$ | $\bar{A} \cdot B$ | $A \cdot \bar{B}$ | $\bar{A} \cdot \bar{B}$ |
| to pin | 5 | 6 | 7 | 8 |
| across a conducting line in the | 1 | 2 | 4 | 8 |
| position of the numeral to pin | 1 | 2 | 3 | 4 |
| and from this pin through detector gate | $A \cdot B$ | $\bar{A} \cdot B$ | $A \cdot \bar{B}$ | $\bar{A} \cdot \bar{B}$ |
| and thence into the stage of the accumulator | 1st | 2nd | 3rd | 4th |
| This pulse, after passing through the delay circuit 26, flips the control circuit 24 from state | $A \cdot B$ | $\bar{A} \cdot B$ | $A \cdot \bar{B}$ | $\bar{A} \cdot \bar{B}$ |
| into state | $\bar{A} \cdot B$ | $A \cdot \bar{B}$ | $\bar{A} \cdot \bar{B}$ | $A \cdot B$ | arrangements the connection of the source circuit to the pin set 5, 6, 7 and 8, and the connection of the detector circuit to the pin set 1, 2, 3 and 4 may be reversed. By this it is meant that the pin connections of the gates $A \cdot B$, $A \cdot \bar{B}$, $\bar{A} \cdot B$ and $\bar{A} \cdot \bar{B}$ in the source and detector circuits may be interchanged, provided they are all interchanged. Either reconnection of the source gates to the next higher numbered pin in the set 5, 6, 7 and 8, or reconnection of the detector gates to the next lower number pin in the set 1, 2, 3 and 4, is possible. If one of the pins, say 4 for example, is divided into two separate parts 4a and 4b, and the corresponding dot on the preprinted format is divided into two separate parts, then only the pin set 1, 2, 3 and 4 is necessary. The source gates $A \cdot B$, $\overline{A} \cdot B$, $A \cdot \overline{B}$ and $\overline{A} \cdot \overline{B}$ may be connected to pins 4a, 1, 2, and 3, respectively, and the detector gates $A \cdot B$, $\overline{A} \cdot B$, $A \cdot \overline{B}$ and $\overline{A} \cdot \overline{B}$ may be connected to pins 1, 2, 3 and 4b, respectively. In this arrangement care must be taken that pins 4a and 4b are never connected electrically. It should also be mentioned that the set of four gate circuits in the source circuit, each of which is controlled by two biases, might be replaced by a set of six gate circuits, each of which is controlled by a single bias. These six gates would be arranged in a tree-like circuit with the output of the pulser going to both of two gates which are opened by the biases A and $\overline{A}$, respectively. The output of each of these gates would go to both the pair of gates opened by the biases B and $\overline{B}$, respectively.

A multi-digit number can be written on a preprinted format with the individual digits of such a number represented by numerals of the present invention. In such a case, the reading head 11 has a separate and identical set of pins 13 and 14 for each numeral. The transmission of pulses from the source circuit to the pins in the reading head, or from the pins to the detector circuit are controlled by a set of gate circuits which allows only one numeral in the row of numerals constituting the number to be read at a time. If a number is written as a row of numerals $a_n$ $a_{n-1}$ . . . $a_2$ $a_1$ $a_0$ to the base $b$ as described above, the read circuit will read $a_0$ into the accumulator one time, $a_1$ into the accumulator $b$ times, $a_2$ into the accumulator $b^2$ times, $a_3$ into the accumulator $b^3$ times, $a_n$ into the accumulator $b^n$ times, etc. The biases that control which numeral in a row of such numerals is being read are provided by the control circuit 28 which receives pulses from the base counting circuit 27 and supplies the appropriate biases to the gate network 18 so that pulses are transmitted only to the pin set making contact with that particular numeral. Alternatively, the control circuit supplies appropriate biases to the gate network 19 so that pulses are transmitted to the accumulator only from the pin set making contact with that particular numeral. In addition, the control circuit 28 also operates to provide bias to the base counting circuit 27.

For the case where numerals are constructed from N straight line segments, the base counting circuit receives one pulse from the state register portion of circuit 24 for each N pulses emitted by the pulser. This follows since the last stage of the state register changes state and transmits a pulse only after N pulses have been received by the circuit from the pulse generator means 17. Accordingly, the base counting circuit 27 transmits one pulse to the circuit 28 for each 1, $b$, $b^2$, $b^3$ . . . $b^n$ pulses that it receives. The biases that the base counting circuit receives from the circuit 28 determines how many pulses must be received by it before it transmits a pulse.

Assuming the parameters used above, if $a_0$ is being read, the base counting circuit transmits a pulse when the pulser has emitted one set of N pulses; if $a_1$ is being read, the base counting circuit transmits a pulse when $b$ sets of N pulses have been emitted by the pulse generator means; if $a_2$ is being read, the base counting circuit transmits a pulse when $b^2$ sets of N pulses have been emitted by the pulse generator means; if $a_n$ is being read the base counting circuit transmits a pulse when $b^n$ sets of N pulses have been emitted; etc. Since the circuit 28 operates to control which particular digit is being read, and it changes the reading device from one digit to another each time it receives a pulse, each pulse emitted by the base counting circuit causes the read device to read a different digit, and causes a digit to be read a number of times corresponding to its base value $b^n$.

Figure 6:
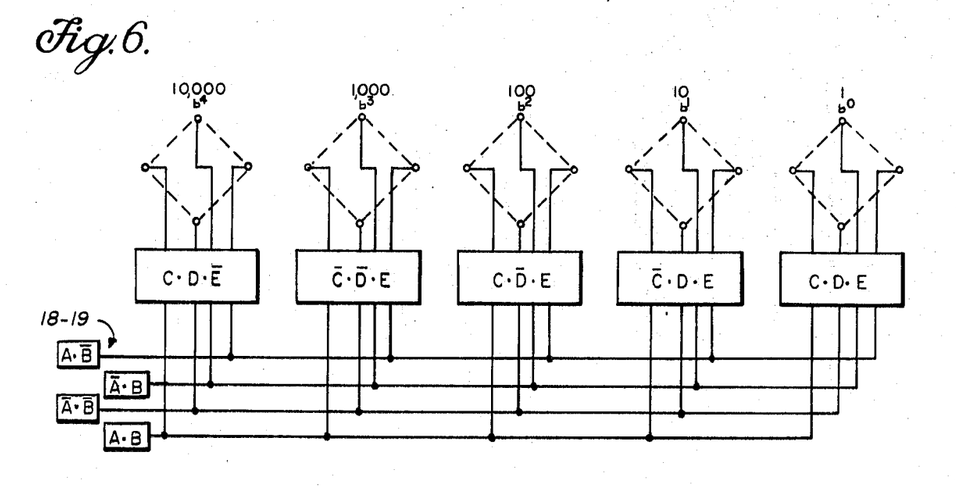
FIG. 6 is a block diagram of a system which enables the circuit of FIG. 4 to select which numeral in a row of numerals written in the form of the present invention that it will read.

FIG. 6 illustrates a circuit arrangement which obviates the necessity of having a separate source gate circuit network 18, or detector gate circuit network 19 for each numeral forming a portion of one number to be read by the present invention. In other words, for the system described above, it would be necessary in order to read a six digit number for six separate source gate circuit networks or detector gate circuit networks to be provided. Since it may be desirable to have a capability of reading numbers with a relatively large number of digits, the circuitry could become so complex and unwieldy as to render the system impractical. FIG. 6 illustrates a portion of a reading circuit which has the capability of reading a multi-digit number, and, at the same time, requires only a single source gate circuit network and a single detector gate circuit network. The necessary selectivity is provided by a series of gates $C \cdot D \cdot \overline{E}$, $\overline{C} \cdot \overline{D} \cdot E$, $C \cdot \overline{D} \cdot E$, $\overline{C} \cdot D \cdot E$, $C \cdot D \cdot E$ which are controlled by control circuit 28 and which are interposed between either network 18 or 19 and the pin operatively associated with those networks. The condition of the flip-flop circuits forming circuit 28 determines which one of the several pin sets have access to the rest of the read system, and each pulse from the base counting circuit to the circuit 28 operates to change the condition of the flip-flops forming circuit 28 such that a different one of the pin sets is operatively engaged with the remainder of the read circuit. The flip-flops of circuit 28 operate not only to select a particular digit for reading, but also, as previously mentioned, operate to provide bias to the base counting circuit whereby the particular digit selected for reading is counted into the accumulator a number of times corresponding to the appropriate base value of that digit. It is this consideration which determines which condition of the flip-flops of the circuit 28 are associated with which digits. Thus, by havng gate $C \cdot D \cdot E$ associated with the digit having a base value of 1 (assuming a decimal number system) and having the system initially start with all of the flip-flops of the circuit 28 in their nonconducting state, it becomes clear that the digit shown to the extreme right in FIG. 6 is the only digit communicating with the gate of either circuit 18 or 19, and thus the only digit operatively associated with the read circuit. After N pulses have been issued from the pulse generator means 17 the base counting circuit receives a pulse and transmits it to the control circuit 28 (the bias to the base counting circuit when all of the flip-flops of the state register are in their nonconducting state being such that a pulse received by the base counting circuit is transmitted) whereby the first stage of the circuit is changed to its conducting state wherein the digit having a base value 10 is placed into operative connection with the read circuit in place of the digit having the base value 1. When the first stage of the control circuit 28 is in its conducting state and all of the remaining stages are in their nonconducting states, the base counting circuit is biased such that it requires 10 pulses before it will transmit 1. Thus, only after 10 pulses have been received will the base counting circuit issue a pulse to the control circuit so as to put the second stage of the register in its conducting state, and return the first stage to its nonconducting state. Since 10 pulses must be received before the base counting circuit transmits a pulse, it follows that the digit having the base value 10 will be read into the accumulator ten times, and thus given its proper base value along with its particular numerical weighting. Particular circuits for performing the function of the base counting circuit in response to the biasing of the control circuit 28 and pulses from the read control circuit will be set forth in detail below. The present invention is, of course, not limited to a decimal numerical structure, as will be clear to those having a familiarity with the basic circuits employed in the present invention. A summary of the operation of a circuit conforming generally to the configuration as shown in FIGS. 4, 5 and 6 is summarized in Table 2 below.

The form of the present invention described above wherein each digit on a format is separately engaged by a separate set of reading pins, is particularly useful in connection with processing numerical information, such as that found on bank drafts (checks), utility company receipts, retail merchant sales documents, etc., all of which are characterized by a relatively small number of digits which must be processed per document in order to obtain all of the desired information from such documents. The present invention is not limited to processing information of this type, however, but does require a different form in order to present a practical means for processing large quantities of numerical data contained on a single format, and for selecting specific data from the total mass of data. The necessity for a different form arises from the fact that the system described above requires gate circuit means to transfer the reading functions from one digit to another such that, if a large number of digits are simultaneously involved, the necessary gating circuitry becomes uneconomically large and complex.

TABLE 2

| | 1st | 10th | 100th | 1,000th | 10,000th |
|---|---|---|---|---|---|
| The base counting circuit, as it is used in this invention, will transmit the ______ pulse from a sequence of pulses received by it when the CDE flip-flops are in states__________ respectively. | C·D·E | C̄·D·E | C·D̄·E | C̄·D̄·E | C·D·Ē |
| Hence the__________ pulse to pass through both flip-flops, A/Ā and B/B̄, flips the CDE flip-flops from state__________ | 1st C·D·E | 10th C̄·D·E | 100th C·D̄·E | 1,000th C̄·D·E | 10,000th C·D·Ē |
| into state__________ | C·D·E | C·D̄·E | C̄·D·E | C·D·Ē | C̄·D·E |
| The bias from these flip-flops causes the set of gates CDE to allow the__________ digit in the number to be read in__________ times. | 1st 1 | 2nd 10 | 3rd 100 | 4th 1,000 | 5th 10,000 | in this paragraph are only presented as examples to make it clear that there are several means for sensing marks presently well known in the art which could be successfully employed for use with the present invention.

Figure 7:
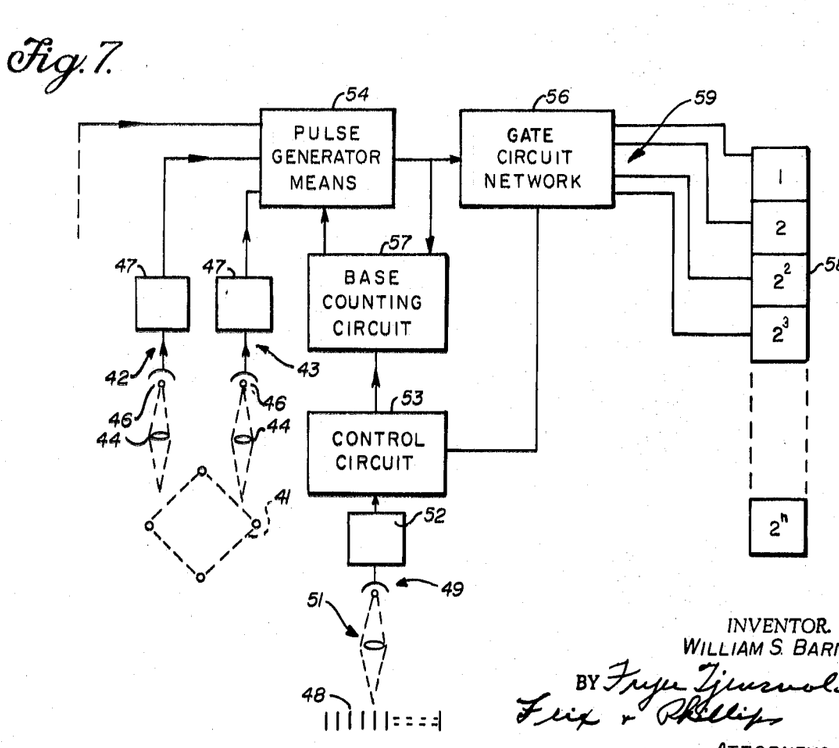
FIG. 7 is a block diagram of a circuit which reads a row of numerals of the system taugh by the present invention by scanning.

Since it is possible that the output of any sensing device may be too weak by itself to operate an accompanying circuit, it would be reasonable to expect amplifiers to be used in conjunction with such sensing devices. The amplifier would then transmit its output to a circuit known as a voltage gate, the function of which is to filter out the smaller variations in voltage and to transmit the larger ones to a circuit performing the function of a pulse shaper. The pulse shaper operates to produce a pulse of uniform magnitude and duration each time a voltage variation is experienced which is of sufficient magnitude to get past the voltage gate. The circuits performing these functions are represented by the blocks 47 in FIG. 7. In order for the reading system of this embodiment to raise the various digits of the format to their appropriate base level, it is necessary to provide a row of control marks 48 on the Thus, referring to FIG. 7 the present invention teaches a system for reading numerals of the present invention which scans whole rows of numerals, such as numeral 41, with a set of sensing devices 42 and 43. While the particular embodiment of FIG. 7 illustrates two separate sensing devices for scanning the numerals 41, it is within the scope of the present invention to construct a scanning mechanism having a single sensing device; the important feature of the scanning mechanism does not reside in the number of sensing devices employed, but rather that in scanning a numeral each space between dot pairs wherein a line segment assigned a numerical value can be drawn, is crossed, and thus interrogated by the scanning mechanism. In the same way that the number of sensing devices and the paths which they may follow will necessarily take varied forms to most efficiently fulfill the specific requirements of a particular application, the nature of the sensing devices themselves is also subject to a relatively wide variation depending primarily on the electronically detectable characteristic of the substance used to define the format dot patterns and the lines drawn between dot pairs thereof. One particular means for scanning includes the use of photocells. A lens 44 focuses light from a very small spot on the surface of the paper (a light being reflected from a light source—not shown) through an aperture leading to a photocell 46. The electro-motive force of the photocell will be relatively constant as long as the scan spot does not cross a mark of any kind. When the scan spot crosses a mark, however, the electro-motive force of the photocell will make a sharp and distinct dip if the width of the mark is about the same size, or larger, than the diameter of the scan spot. Another possible method of scanning involves the use of ink or lead containing materials of high magnetic permeability. As the paper containing the numerals passes between the poles of a sensitive electromagnet, the marks are carried between the poles of the magnet causing a small change in reluctance in the magnetic circuit. This change in reluctance in turn produces a small variation in the current through the windings of the electromagnet. As mentioned above, however, the precise method of sensing the marks is not a part of the present invention and the techniques mentioned format. A separate auxiliary scanning mechanism 49, including a sensing means 51 and appropriate circuit means 52, is provided for scanning the control marks. The output of the scanning means 49 is directed to a control circuit 53 which provides the biases which control the read operation. The number of control marks 48 and the movement of the scanning means 49 relative to the scanning means 42 and 43 is such that N marks 48 are scanned during the time the scanners 42 and 43 scan a single digit 41 wherein the digit 41 includes N possible straight line segments between dot pairs of the dot pattern which have been assigned numerical values. Hence, the sensing device 51 emits N pulses during the scanning of each numeral position, making it possible for the control circuit 53 to provide N bias patterns as required.

When either of the scanning means 42 or 43 detects a line it emits a pulse which is directed to a pulse generator means 54. A pulse from the scanning mechanism to the pulse generator means 54 operates to activate the pulse generator, wherein pulses are directed from the pulse generator means to a gate circuit network 56 and a base counting circuit 57. The gate circuit 56 is electrically disposed between the pulse generator means 54 and an accumulator register means 58 which has a plurality of inputs 59 equal in number to the number of different line segments which are assigned numerical values. The gate circuit network 56 operates in essentially the same manner as the detector gate circuit network 19 of FIG. 3 in that it directs the pulses which it receives into the nth stage of the register when the numeral line having the value $2^n$ is sensed.

In the scanning of a multi-digit number the scanning device may scan from the highest valued numeral $a_n$ to the lowest $a_0$ or from $a_0$ to $a_n$. The control circuit 53 also controls the operation of the base counting circuit 57, which in turn determines the number of pulses emitted by the pulse generating means 54 when a numeral mark is detected. This control consists of shutting off the pulser after one pulse has been emitted when a mark is detected in $a_0$, or after $b$ pulses have been emitted when a mark is detected in $a_1$, or after $b^2$ pulses have been emitted when a mark is detected in $a_2$ . . . or after $b^n$ pulses have been emitted when a mark is detected in $a_n$. To perform this operation, the control circuit counts each set of N pulses produced by the control sensing unit 51 and provides a unique and different bias for the base counting circuit 57 for each set of such pulses.

Figure 8:
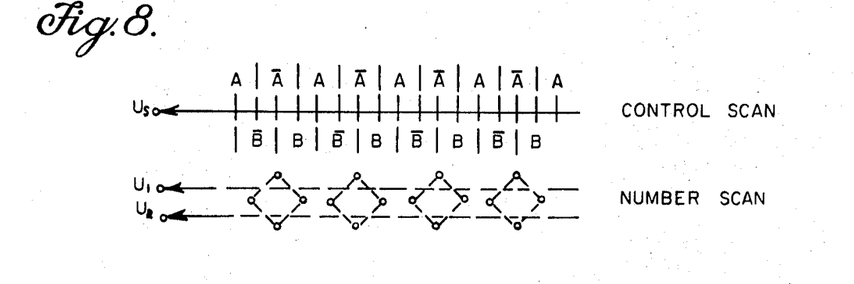
FIG. 8 illustrates possible scan paths which may be used in conjunction with the system of FIG. 7 wherein a four dot format is employed.
Figure 9:
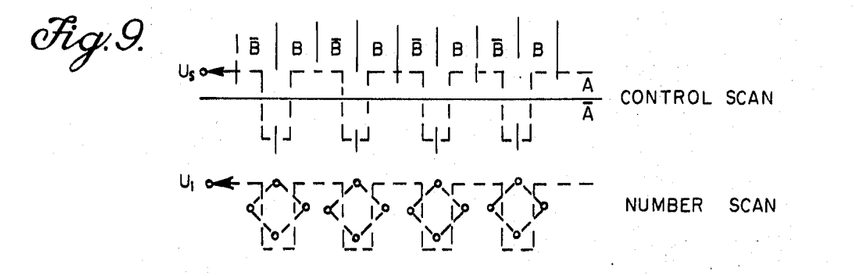
FIG. 9 is an illustration of scanning paths which may be used as alternates to the paths shown in FIG. 8.
Figure 10:
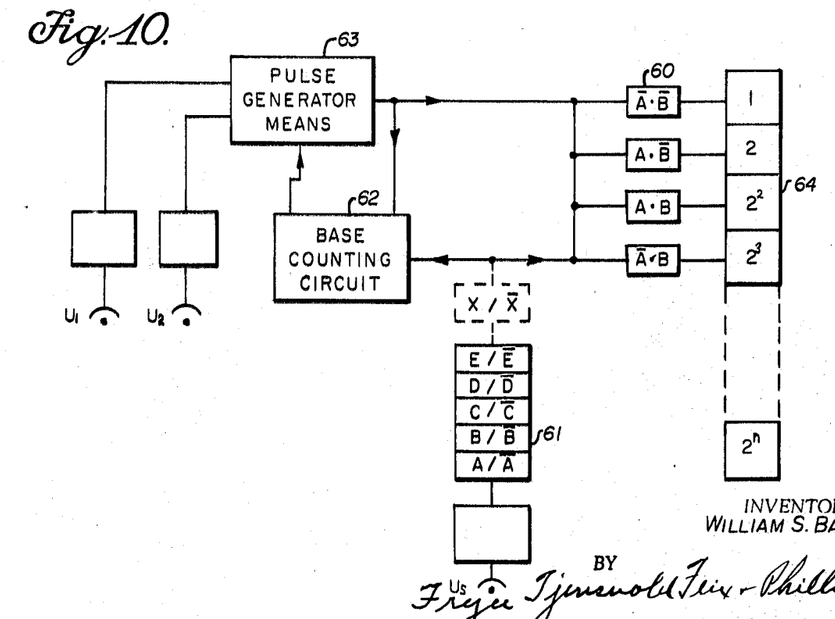
FIG. 10 is a block diagram of a specific embodiment of a system for reading numerals in a four dot form by using the scan pattern of FIG. 8.

For the purposes of illustrating the operation of a scanning system in reading a number, it is assumed that numerals are written on a format in four dot patterns according to the convention of FIG. 2. Two scan patterns along which sensing devices could move in their scanning patterns are shown in FIGS. 8 and 9. In traversing these scan patterns, either the medium on which the numerals are written or the sensing devices could be moved. FIG. 10 illustrates a circuit designed for operation along the paths shown in FIG. 8 wherein scanning means $U_1$ and $U_2$ are employed for reading the numerals while a scanning means $U_s$ scans the control marks. As $U_1$ and $U_2$ scan each numeral, $U_s$ scans a series of four control marks along the edge of the medium on which the numerals are written. The pulses produced by the control marks are directed into a control circuit 61. In this particular system a base counting circuit 62 is not interposed between the control stages $B/\overline{B}$ and $C/\overline{C}$ as suggested in embodiments described above, but is used in the read circuit to turn off a pulse generator means 63 after an appropriate number of pulses have been transmitted to an accumulator register means 64. As best seen with reference to FIG. 8 the sensing devices $U_1$ and $U_2$ move in straight, parallel paths with sensing device $U_1$ leading device $U_2$ by a length which is approximately one-quarter of the width of the numeral dot pattern. The first operation in the reading of a numeral occurs when $U_1$ crosses the position of the mark in the fours position in the numeral (see FIG. 2). The resulting signal from $U_1$ starts the pulse generator means 63. The pulse generator means emits pulses until a pulse gets through the base counting circuit and back to the pulse generator means to turn the generator means off. The number of pulses which the pulse generator means has to emit before a pulse is able to get through the base counting circuit to shut off the pulse generator means is controlled by the base counting circuit 62, which is in turn controlled by the bias provided from control circuit 61. At this initial stage in the operation, the stages $A/\overline{A}$ and $B/\overline{B}$ are in state $A \cdot B$. Hence the pulses from the pulser (if any) all go through gate $A \cdot B$ disposed between the pulse generator means 63 and the register accumulator means 64. Hence the pulses from the pulser go through gate $A \cdot B$ into the fours (3rd) stage of the accumulator 64. At this point the control sensor $U_s$ crosses a control mark and transmits a pulse into the control circuit 61 (state register) which flips the state register into state $\overline{A} \cdot B$. The sensing device $U_2$ now crosses the line in the eights position in the numeral. The output of the pulser, if any, now goes into the eights (4th) stage of the accumulator. These operations and subsequent operations in the reading of a numeral with the scan system illustrated in FIG. 10 are summarized in Table 3 below. The A and B designations between control marks shown in FIG. 8 indicate the states of the flip-flop circuits before and after a control mark is passed by the sensor $U_s$.

TABLE 3

| Sensing unit | 1 | 2 | 1 | 2 |
|---|---|---|---|---|
| crosses the position of the mark in the | 4's | 8's | 2's | 1's |
| position in the numeral. The pulse from this sensing unit starts the pulser and transmits pulses to the gate and base counting circuits. Since the stages $A/\overline{A}$ and $B/\overline{B}$ of the control circuit 61 are in state | A·B | $\overline{A}$·B | A·$\overline{B}$ | $\overline{A}$·$\overline{B}$ |
| these pulses go into the | 3rd | 4th | 2nd | 1st |
| stage of the accumulator. $U_s$ now transmits another pulse into the control circuit which flips it into state | $\overline{A}$·B | A·$\overline{B}$ | $\overline{A}$·$\overline{B}$ | A·B |

The circuit of FIG. 10 can, with very minor modification, be used for the scan pattern of FIG. 9 wherein a single sensor $U_1$ is employed in the place of the two sensors of FIG. 10. The system need only be modified by reconnecting the gate $A \cdot \overline{B}$ to stage 1 and gate $\overline{A} \cdot \overline{B}$ to stage 2 of the accumulator 64 and eliminating one of the two sensing devices. The pattern of control marks needs also to be changed, whereby the sensing device $U_s$ follows a path similar to the path of the sensing device $U_1$.

Occasions may arise when it is desired that a number of the form $a_{n+i} \, a_{n-1+i} \ldots a_{i+2} \, a_{i+1} \, a_i$ be read into an accumulator register in its correct binary form. As indicated by the notation, the lowest ranking digits $a_i$ in this number is not the coefficient of one ($b^0=1$) as previously specified but is the coefficient of $b^i$, where $i$ is greater than or equal to 1. For instance a quantity may be measured as having a magnitude of 283000 with an accuracy that allows the first three digits to be specified but not the last three. Hence this number could be recorded as $283 \times 10^3$. Furthermore, it might be desired to record this number in a space on a preprinted format in which there was not enough room for all six digits. If the accumulator is nevertheless large enough to accommodate a number of this magnitude in pure binary form, it would be desirable to be able to read such a number without the necessity of recording all six digits.

The present invention teaches a provision for carrying out the desired operation outlined above, as will now be fully explained. The exponent $i$ of the base $b$ associated with the lowest ranking digit $a_i$ can be recorded in a special numeral position which is read by the read circuit prior to reading the rest of the digits. Provision is made in the circuit to read $i$ directly into the control circuit 28 (see FIGS. 3 and 4) in the case of the conduction read system. In the case of a scan system, $i$ is read directly into that part of the control circuit 61 (see FIG. 10) which controls the base counting circuit, namely the stages labeled $C/\overline{C}$, $D/\overline{D}$, $E/\overline{E}$, etc. The reading of the numeral then starts with the reading of the lowest ranking digit $a_i$. Each mark in $a_i$ results in $b^i$ pulses being counted into the appropriate stage of the accumulator register. The reading of the rest of the number proceeds as described previously with the exponent of the base $b$ being increased by one for each successive digit.

The exponent $i$ may be distinguished from the number digits on the preprinted format by being placed in a field on the format reserved for this purpose. The gate circuit network 18 (see FIG. 3) directs the pulses to the source pin set making contact with this numeral first. The corresponding detector pin set would be connected to a special gate circuit network similar to gate circuit network 19 but controlled only by the control circuit 24 which would direct the pulses to the control circuit 28 rather than to the accumulator. In the case of the scan system, the exponent $i$ would be scanned by the same sensing units used to scan the other numerals and the resulting pulses directed by the gate circuit network 60 (see FIG. 10) into the appropriate stages of the control circuit 61, or it could be scanned by a special sensing unit whose operation would be controlled only by the stages 61 corresponding to those labeled $A/\overline{A}$ and $B/\overline{B}$.

It is intended that the circuit shown in FIG. 10 be used in conjunction with other electro-mechanical devices which will enable this circuit to read selected numbers from an array of such numbers written in a coded form such as that of FIG. 1 or 2 in rows and columns on a data medium such as a sheet of paper. It is a part of the function of the electro-mechanical devices to provide a capability for the periodic scanning of such an array of numbers by a set of sensing elements. Referring to FIG. 17, the paper 71 on which the numerals are written may be mounted on the outer surface of a drum 72 which may be rotated rapidly. Here we will adopt the convention of rows and columns in such an array that a sequence of digits representing a single number is written in a row and the columns of numerals or numbers are perpendicular to the rows. The rows of numerals may be either parallel to the axis of the drum or run circumferentially around the drum in different embodiments. As the drum rotates, pairs of sensing devices 73 having scanners $U_1$ and $U_2$ and mounted on a rigid bar 74 close to the external surface of the drum scan the format positions in each circumferential row or column as they pass. In order to select the row or column to be read, only the sensing devices scanning that row or column are activated. For an embodiment using photo-cells as sensing devices, duplication of the read circuits may be avoided by use of optical fibers in the following way. Optical fibers run from the $U_1$ scan paths in each row or column to a single photo-cell $U_1$, and similar optical fibers run from the $U_2$ scan paths in each row or column to another photo-cell $U_2$. Selection of the circumferential row or column to be read is accomplished by illuminating selectively only that row or column.

Figure 11:
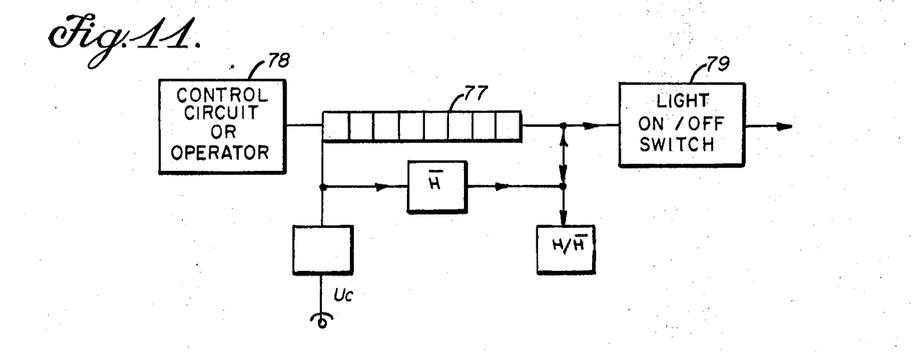
FIG. 11 is a block diagram of a circuit which controls the particular row or column of numerals which are read from a large array of numerals.

For the case where the rows of numbers run circumferentially around the drum, and the columns run parallel to the axis of the drum, provision will be made to read the numbers in a particular column by the use of a row of control marks 76 along the edge of the paper and running circumferentially around the drum. Referring to FIG. 11 as well, as the drum rotates these marks are scanned by a sensing device $U_c$, which delivers its count into a register 77, called the control register, which is just a series of flip-flop circuits connected in series. Each mark 76 in the control sequence is placed so that it is sensed just before $U_1$ and $U_2$ arrive at the position of the number to be read and after they have passed the position of the previous number in the row. The next mark in the control sequence is placed so that it is sensed just after $U_1$ and $U_2$ pass the position of the number that has been read and before they arrive at the position of the next number. The control marks in this sequence are called the column marks. When a number in column $n$ is to be read, a control circuit 78 or the operator counts $C(n)$ pulses into the control register 77. Here $C(n)$ is the complement of $n$. The last stage in the register 77 transmits its pulses to the light switching circuit 79, off/on, and to a control flip-flop circuit $H/\overline{H}$. When the register 77 has had N pulses counted into it, all of its stages are in their conducting states. Hence, the next pulse clears it, flips the light switching circuit off/on from off to on, and flips $H/\overline{H}$ from H to $\overline{H}$. The next pulse after this one puts a count in the register 77, and passes a pulse through a gate $\overline{H}$ operatively disposed between control circuit 78 and both circuit $H/\overline{H}$ and switch 79, which flips circuit $H/\overline{H}$ from $\overline{H}$ into H and flips light switching circuit 79 from on back to off. Whether or not there are $N+1$ columns of numbers, the row of control marks 76 controlling this operation has $N+1$ marks in it somewhere. Hence, if no number is placed in the register 77, the read circuit will only be in operation after it passes the last mark on the page and before it reaches the first mark again. If a number $C(n)$ is in the register 77 it will count $n$ marks, read until it finds the next mark, then count $N+1$ marks (or go one complete revolution) before it reads again. Hence, unless further control is provided this device will read the number it is set to read once each revolution. To further control the read operation, some device (not shown) is used to emit a pulse or signal once each revolution when the read device is passing the last mark in the control sequence. This pulse or signal will be called the turn signal. Further control circuits may count these pulses to control how many times a particular number should be read by the device.

In the event that the rows of numerals run parallel to the axis of the drum, and the columns of numbers run circumferentially around the drum, the scan paths will pass vertically through the numerals instead of horizontally as shown in FIG. 8. In this event the gate circuits shown in FIG. 10 would have to be reconnected to the appropriate accumulator stages to conform to the sequence in which $U_1$ and $U_2$ cross the marks in the different positions in the numerals. The state register is rearranged so that the flip-flop circuits, $C/\overline{C}$, $D/\overline{D}$, $E/\overline{E}$, etc., no longer receive pulses from the flip-flop $B/\overline{B}$ but are used to count the turn signals. The sequence of control marks, which was used above to identify columns in which a number was to be read, is now used to identify the row. Hence the marks that were called the column marks in the paragraph above will be called the row marks. Hence one numeral in a given number will be read during each revolution of the drum. The bias from the flip-flops CDE control the base counting circuit as has been described previously. The application of the voltage from the light switching circuit to the various lights illuminating the different columns of numerals is controlled by the CDE biases by means of gates in a manner shown in FIG. 16. Thus in the reading of a multi-digit number the first numeral on the right is read in on the first revolution of the drum with one pulse for each line crossing, the second numeral from the right is read in on the second revolution with ten pulses for each line crossing, etc.

The control marks in FIG. 7 could be used for either the column or row marks. For numbers constructed of N line segments (and, hence, using N control marks for the reading of each numeral), the control circuit 78 could transmit every Nth control mark pulse into the control register 77 as a row signal when the rows of numerals run perpendicular to the scan paths. When the rows of numerals are parallel to the scan paths and when each number is written on an $m$ digit format, the control circuit could transmit each $(m \cdot N)$th control mark pulse to the control register 77 as a column signal.

Table 4 sets forth how the base counting circuit processes a sequence of digits. If a number is to be processed (read, etc.) starting with the lowest ranking digit then $N_1$, $N_2$, $N_3$, $N_4$, etc. are 1, $b$, $b^2$, $b^3$, $b^4$, etc., where $b$ is the base. If the number contains six digits, and it is to be processed starting with the highest ranking digit then $N_1$, $N_2$, $N_3$, $N_4$, $N_5$, and $N_6$ are $b^5$, $b^4$, $b^3$, $b^2$, $b$, and 1, respectively.

TABLE 4

| | | | | | | |
|---|---|---|---|---|---|---|
| The function of the base counting circuit in this invention is to block | $N_1-1$ | $N_2-1$ | $N_3-1$ | $N_4-1$ | $N_5-1$ | $N_6-1$ |
| etc., pulses from a sequence of such pulses that it receives, then transmit the | $N_1$th | $N_2$th | $N_3$th | $N_4$th | $N_5$th | $N_6$th |
| pulse depending on whether the control circuit is in state | $C \cdot D \cdot E$ | $\overline{C} \cdot D \cdot E$ | $C \cdot \overline{D} \cdot E$ | $\overline{C} \cdot \overline{D} \cdot E$ | $C \cdot D \cdot \overline{E}$ | $\overline{C} \cdot D \cdot \overline{E}$ |
| etc., respectively. | | | | | | |

Figure 12:
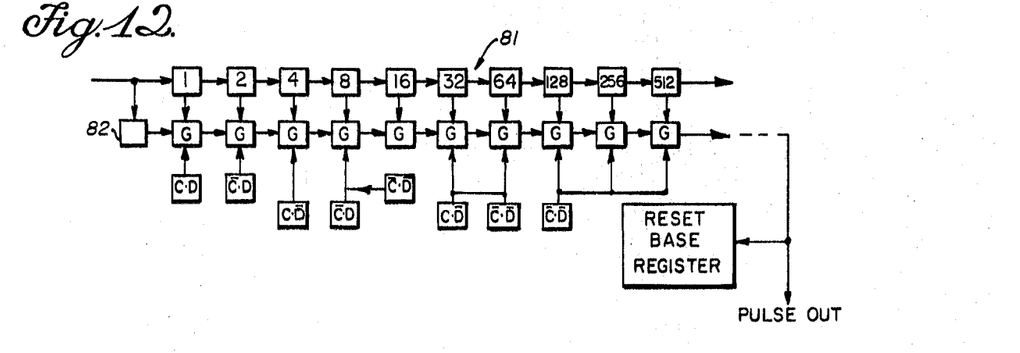
FIG. 12 is a block diagram of a base counting circuit which is used in the several embodiments of the read portion of the present invention.

Referring to FIG. 12, the portion of a base counting circuit which blocks or transmits the pulses which it receives are the set of gate circuits G, which are connected in series. Each of these gate circuits will transmit a pulse if it receives a bias from each of two other associated circuits or if it receives no bias at all. If it receives a bias from only one associated circuit t will block the transmission of a pulse. One of the circuits which provides biases for the gates is the series of flip-flop circuits 81 referred to as the base register. The number of flip-flop circuits in this register is equal to the number of gate circuits G. Each flip-flop in the series 81 provides a bias to its corresponding gate G when it is in its conducting state but provides no bias if it is in its nonconducting state. The second bias is provided to some of the gate circuits by a set of circuits which are controlled by a control circuit such as circuit 61 of FIG. 10. The circuits which provide these biases are designated $C \cdot D$, $\overline{C} \cdot D$, $C \cdot \overline{D}$, and $\overline{C} \cdot \overline{D}$, respectively. These labels are intended to signify that these circuits provide biases to their associated gate circuits G when the control circuit is in the state designated by the label. For the sake of brevity, the base counting circuit in FIG. 12 is designed to control the processing of numbers containing only four digits. Hence, only two flip-flops in the state register, $C/\overline{C}$ and $D/\overline{D}$, need be used to provide biases for this operation. In a base counting circuit intended for processing numbers with more than four digits, the bias circuits would be controlled by the flip-flops $E/\overline{E}$, etc., in the control circuit also. The circuit shown in FIG. 12 is also set up to read numbers written to the base ten starting with the lowest ranking. Table 5 sets forth the operation of this circuit. The sequence of pulses which is being transmitted to the base register is also being transmitted after a slight delay caused by a delay circuit 82, to the series of gates G. The particular pulses which cause the biases received from the bias circuits CD to be exactly matched by the biases received from the base register 81 are thus the only pulses in the sequence which are able to pass through all the gates G. Each of these pulses resets the base register and performs all the operations ascribed elsewhere in this description to the base counting circuit.

TABLE 5

| During the processing of the digit | $a_0$ | $a_1$ | $a_2$ | $a_3$ |
|---|---|---|---|---|
| the state circuit is in state | $C \cdot D$ | $\overline{C} \cdot D$ | $C \cdot \overline{D}$ | $\overline{C} \cdot \overline{D}$ |
| Hence the bias circuit with this label provides biases to the gate circuits which also receive biases from the stages of the base register which are conducting after the register has received ______ pluses. | 1 | 10 | 100 | 1,000 |

Figure 13:
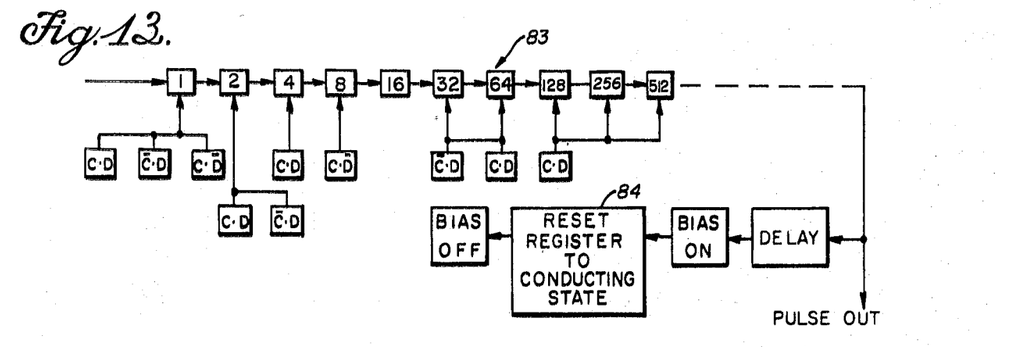
FIG. 13 is a block diagram of an alternate embodiment of a base counting circuit.

FIG. 13 shows in block diagram form another base counting circuit. This circuit is again only capable of processing four-digit numbers. However, to show how the base counting circuit may be used to process numbers starting with the highest ranking digit, the bias circuits of FIG. 12 have been rearranged. The flip-flop circuit in the base register 83 in this circuit differs in two ways from the flip-flop circuits in other registers in this invention, The reset functon shown as a block 84 represents a circuit which resets the flip-flop circuits in the base register into the conducting state rather than into the nonconducting state as is usual, and the biases function to place and hold the flip-flop circuit to which they are applied in the nonconducting state regardless of the action of the reset circuit. The biases are only on during the reset operation. Table 6 explains the operation of this circuit.

TABLE 6

| During the processing of the digit | $a_3$ | $a_2$ | $a_1$ | $a_0$ |
|---|---|---|---|---|
| the control circuit is in the state | $C \cdot D$ | $\overline{C} \cdot D$ | $C \cdot \overline{D}$ | $\overline{C} \cdot \overline{D}$ |
| A pulse which is transmitted through the base register will, because of the combined action of the biases and the reset circuit, set the complement of ______ in the base register when the state circuit is in state. | 1,000 | 100 | 10 | 1 |
|  | $C \cdot D$ | $\overline{C} \cdot D$ | $C \cdot \overline{D}$ | $\overline{C} \cdot \overline{D}$ |
| Thus the base register will only overflow and transmit a pulse when ______ pluses have been transmitted to it. | 1,000 | 100 | 10 | 1 |

Figure 14:
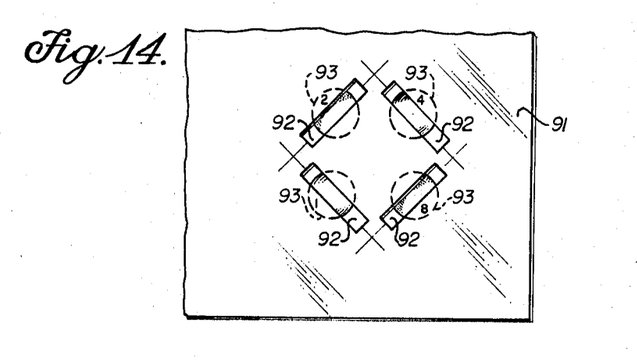
FIG. 14 illustrates simplified means for displaying numerals of the present invention.

Referring to FIG. 14, the display of a single numeral stored in a register such as the accumulator can be accomplished by means of a sheet of opaque material 91 with slots 92 cut in it. These slots are arranged in a geometrical configuration identical to that of the new numerals such as that shown in FIGS. 1 and 2. A light 93 is incorporated in the appropriate part of each flip-flop circuit of the register containing the number represented by the numeral so that it will be lighted when that flip-flop is in the conducting state and be out when the flip-flop is in its nonconducting state. Such an arrangement is frequently used in binary scalar counting circuits of such devices as electronic counting equipment (Geiger counters, etc.). The lights 93 are placed behind the sheet of opaque material so that each light illuminates the appropriate slot. The lights with the values 1, 2, 4, and 8 are in the first, second, third, and fourth stages of the register, respectively.

Figure 15:
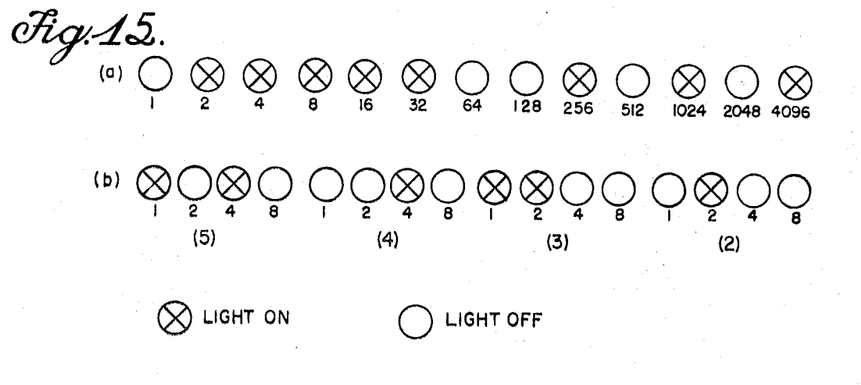
FIG. 15 illustrates for purposes of comparison with FIG. 14 a number as it would appear if displayed by means of lights in register circuits associated with binary and binary coded decimal conventions.

To be displayed in the manner described above, a multi-digit number must be stored in a binary coded form in the circuits of the computer or other automatic device, i.e. each $a_i$ must be stored in binary form in a separate register or in a separate part of one register. In most digital computers or other devices using numbers in binary form, numbers are stored in pure binary form. FIG. 15(a) shows how the number 5432 would appear in pure binary form; FIG. 15(b) shows how it would appear in binary coded decimal. Virtually all digital computers in use today have, among their output circuits, circuits capable of translating numbers from their pure binary form to binary coded form. A circuit capable of performing this function is now presented as a part of this invention.

Figure 16:
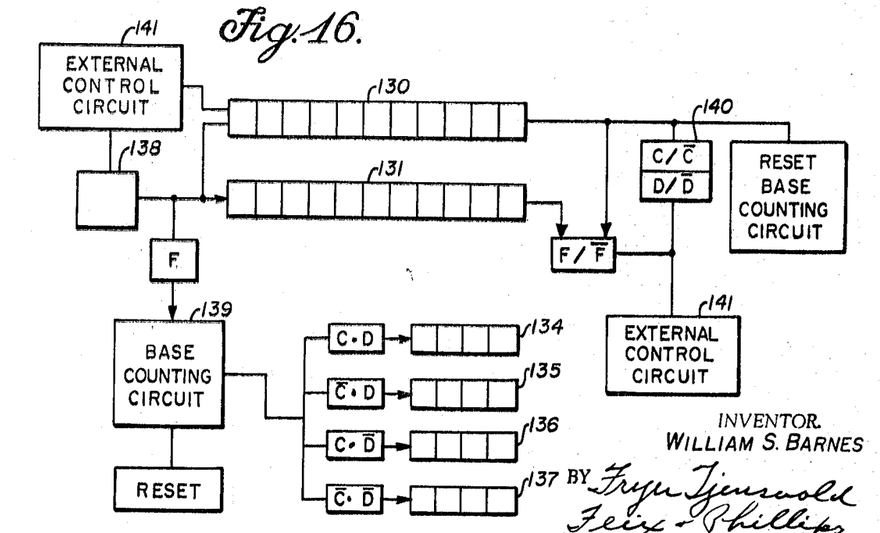
FIG. 16 is a block diagram of a system which operates to convert a pure binary number into the form of a binary coded number.

FIG. 16 is a block diagram of a circuit capable of converting pure binary numbers into a binary coded form. For the sake of brevity this circuit has been restricted to a size that can process only four-digit numbers. The design of devices to process larger numbers could be made by merely adding more flip-flop circuits, gates, etc. to the above circuit. This device consists of two registers, 130 and 131, a flip-flop circuit $F/\overline{F}$ and a gate F which transmits pulses only when the flip-flop $F/\overline{F}$ is in the state F, four registers 134, 135, 136 and 137 and the gate circuits $C \cdot D$, $\overline{C} \cdot D$, $C \cdot \overline{D}$ and $\overline{C} \cdot \overline{D}$, which control the flow of pulses to the registers 134, 135, 136 and 137, respectively. It also utilizes a pulser 138, a base counting circuit 139, and a control circuit 140, all of the same kind described in other parts of this description. The boxes labeled "external control circuit" 141 represent the computer or operator that is utilizing this device.

In operation, this device takes a pure binary number whose value is $x$ where $$x = a_3 \cdot b^3 + a_2 \cdot b^2 + a_1 \cdot b + a_0$$

and computes the coefficients $a_3$, $a_2$, $a_1$ and $a_0$ which it stores in binary form in the registers 134, 135, 136 and 137. To initiate this operation, the external control circuit 141 first transmits the complement of $x$, $C(x)$, into the register 130, then starts the pulser 138. The control circuit 140 is in state $C \cdot D$ and the flip-flop $F/\overline{F}$ is in state F. The pulser begins to transmit pulses simultaneously into the registers 130 and 131 and into the base counting circuit 139. In this application the base counting circuit must be set to process the digits starting with the highest ranking first as described with reference to FIG. 13. The subsequent sequence of operations is described below in Table 7.

The pulse which flips the control circuit 140 from $C \cdot D$ to $\overline{C} \cdot D$ leaves the flip-flop $F/\overline{F}$ into state F so provision is made that this pulse flip $F/\overline{F}$ back into state F after it passes through the state register. In describing the above operation, explicit provision is made in FIG. 16 to reset the base counting circuit only when the register 130 overflows. The base counting circuit 139 also resets itself automatically when it transmits a pulse.

TABLE 7

| | $b^3$ | $b^2$ | $b$ | 1 |
|---|---|---|---|---|
| Each time the pulser 138 transmits pulses to the base counting circuit 139, the base counting circuit transmits one pulse into register | 134 | 135 | 136 | 137 |
| because the state register is in state | $\bar{C} \cdot D$ | $\bar{C} \cdot D$ | $\bar{C} \cdot \bar{D}$ | $\bar{C} \cdot \bar{D}$ |
| It also resets 131. After | $a^3$ | $a^2$ | $a_1$ | $a_0$ |
| pulses have been transmitted into the register | 134 | 135 | 136 | 137 |
| the number of pulses necessary to make 130 overflow is less than | $b^3$ | $b^2$ | $b$ | 1 |
| Hence 130 overflows and transmits a pulse. This pulse flips the control circuit from state | $C \cdot D$ | $\bar{C} \cdot D$ | $C \cdot \bar{D}$ | $\bar{C} \cdot \bar{D}$ |
| into state | $\bar{C} \cdot D$ | $C \cdot D$ | $\bar{C} \cdot \bar{D}$ | $C \cdot \bar{D}$ |
| resets the base counting circuit, and flips $F/\bar{F}$ from F to $\bar{F}$. The gate F now blocks pulses from getting into the base counting circuit. The remainder is now stored in 131. The pulser now transmits | $x_1 = a_2 \cdot b^2 + a_1 \cdot b + a_0$ $C(x_1)$ | $x_2 = a_1 \cdot b + a_0$ $C(x_2)$ | $x_3 = a_0$ $C(x_3)$ | 0 |
| pulses into both 130 and 131. This causes 131 to overflow, clear, and flips $F/\bar{F}$ into F. The process is now repeated until all digits are stored. | | | | |

What is claimed is:

1. In a data processing system, the combination comprising:
    (a) a data medium having a plurality of identical dot patterns established thereon wherein each separate dot pattern has more than two dots, said data consisting of selectively disposed, non-intersecting, substantially straight, detectable line segments connecting dot pairs in each dot pattern wherein the values assigned to the lines between the dot pairs are equal to $2^n$ where $n$ is different for each dot pair in a single dot pattern and progresses from 0 consecutively to a maximum of $N-1$ where N is equal to the number of said line segments that can be drawn between the different dot pairs in a single dot pattern;
    (b) an accumulator register means having direct input means to the first N stages thereof, said accumulator register means disposed to accumulate the effects of a sequence of pulses received through any of said input means; and
    (c) detection means to detect the presence of lines between all of the N dot pairs in each dot pattern, said detection means disposed to emit pulses into the $(n+1)^{st}$ input means of the accumulator register means when a line having a value of $2^n$ is detected in one of the dot patterns, where again $n$ may have an integral value from 0 to $N-1$ inclusive.

2. The system of claim 1 further comprising:
state register means operatively associated with the detection means, said state register means operable to control the number of pulses emitted by said detection means in response to the detection of a line in any particular dot pattern wherein the number of pulses emitted is preselected as desired.

3. The system of claim 2 further comprising:
control means operatively associated with the detection means, said control means operable to cause said detection means to emit pulses only when a line between a dot pair in a desired dot pattern is detected.

4. The system of claim 3 further comprising:
program means operatively associated with the detection means, the state register means, and the control means, said program means operable to cause said detection means to detect all lines in each of a selected series of dot patterns from amongst a plurality of such dot patterns, said program means further operable jointly with said state register means and said control means to cause the detection means to emit a different number of pulses upon detection of a line in each different dot pattern, each of said numbers being associated as desired with each of said dot patterns.

5. The system of claim 4 wherein the dot patterns are disposed in linear arrays for the purpose of recording multi-digit numbers, wherein each digit of a multi-digit number is represented by the lines between dot pairs in a separate single dot pattern, the aggregate value of said line segments in each said dot pattern equalling the face value of each said digit, and wherein the program means includes:
base counting circuit means, said base counting circuit means operable to cause said detection means to emit $b^m$ pulses into the accumulator register input means upon detection of a line in a dot pattern corresponding to a digit in a multi-digit number whose value in said number is obtained by multiplying said digit by $b^m$ where $b$ is the base to which said number is written and the exponent $m$ is the integral power of said base corresponding to the rank or position of said digit in said number.

6. The system of claim 1 wherein the data medium consists of an electrically non-conductive material, the detectable line segments are composed of an electrically conductive substance, and the detection means includes the combination comprising:
    (a) an electric pulse generating means which functions to produce a series of electric pulses;
    (b) electric contact means, said electric contact means making electrical contact with the data medium at two places along the locus of each possible line segment connecting dot pairs in every dot pattern, said electric contact means disposed so that a line segment between any dot pair will make electric connection between the two electric contact means located at the locus of said line segment operative to allow an electrical pulse to pass from one of the two contact means to the other; and
    (c) gate network means operatively associated with the electric pulse generating means, the electric contact means, and the accumulator register input means, said gate network means operable to direct a series of pulses from the electric pulse generating means consecutively to one electric contact means in each pair of electric contact means at the locus of each line segment, said gate network means further operable to direct pulses from the other electric contact means at the locus of each line segment to the appropriate accumulator register input means.

7. The system of claim 6 further comprising:
state register means operatively associated with the electric pulse generating means and the gate network means, said state register means operative to count pulses emitted by said electric pulse generating means and to cause said gate network means to direct only the desired number of pulses from the electric pulse generating means to the electric contact means at the locus of each line segment in a particular dot pattern.

8. The system of claim 7 further comprising:
control register means operatively associated with the gate network means, said control register means operative to cause the gate network means to direct pulses from the electric pulse generating means to the electric contact means associated with only one dot pattern from amongst a plurality of such patterns and, thence, to the appropriate accumulator register input means when the presence of line segments makes electrical contact between the pairs of said electric contact means at the locus of each possible line segment in said dot pattern.

9. The system of claim 8 further comprising:
program means operatively associated with the gate network means, the state register means, and the control register means, said program means operative to cause said gate network means to direct pulses from said electric pulse generating means to said electric contact means at each of a selected series of dot patterns from amongst a plurality of such dot patterns and, thence, to the appropriate accumulator register input means when the presence of line segments makes electrical contact between the pairs of said electric contact means at the locus of each possible line segment in each said dot patterns, said program means further operable jointly with said state register means and said control register means to direct different numbers of pulses to the electric contact means at different dot patterns, each of said numbers being associated as desired with each of said dot patterns.

10. The system of claim 9 wherein the dot patterns are disposed in linear arrays on the data medium, each said linear array being used for the purpose of recording a multi-digit number, wherein each digit of said multi-digit number is represented by line segments between dot pairs in a single separate dot pattern, the aggregate value of said line segments in each said dot pattern equalling the face value of each said digit, and wherein the program means includes:
base counting circuit means, said base counting circuit means operable jointly with said program register means to cause said gate network means to direct pulses to the electric contact means during the time $b^m$ pulses are emitted by the electric pulse generating means while reading a dot pattern corresponding to a digit in a multi-digit number whose value in said number is obtained by multiplying said digit by $b^m$ where $b$ is the base to which the number is written and the exponent $m$ is the integral power of said base corresponding to the rank or position of said digit in said number.

11. The system of claim 1 wherein the data medium has disposed upon it a series of detectable control marks accurately positioned with respect to the dot patterns and the detection means includes the combination comprising:
(a) scanning means disposed to move relative to said data medium and pass between dot pairs which may have detectable lines therebetween, said scanning means operable to detect line segments and emit pulses when a detectable line segment is encountered;

(b) auxiliary scanning means disposed to move relative to said data medium scanning the area of the data medium wherein the control marks are disposed, said auxiliary scanning means operable to detect all control marks and issue a pulse when a detectable control mark is encountered, said auxiliary scanning means positioned relative to the scanning means so as to coordinate the detection of the specific control marks with the detection of specific line segments within each dot pattern;

(c) gate network means operatively associated with the scanning means and the accumulation register input means; and (d) control circuit means operatively associated with the gate network means and the auxiliary scanning means, said control circuit means operative to count the control marks detected by the auxiliary scanning means and to cause the gate network means to direct pulses from the scanning means to the appropriate accumulator register input means, the particular input means being determined by said control mark count.

12. The system of claim 11 wherein the scanning means includes:
pulse generating means, said pulse generating means operative to emit a desired number of pulses through the gate network into the accumulator register input means upon detection of a detectable line segment by the scanning means.

13. The system of claim 12 wherein the control circuit means includes:
control register means, said control register means operative to cause the scanning means to detect line segments occurring in one desired dot pattern only from amongst a plurality of such patterns, said dot pattern in which line segments may be detected being identified by said control register by means of the control mark counts associated with said dot pattern.

14. The system of claim 13 wherein the control circuit means includes:
program register means operatively associated with the pulse generating means and the control register means, said program register means operative to cause the scanning means to detect line segments occurring in only a selected series of dot patterns from amongst a plurality of such dot patterns, said program register further operative to cause the pulse generating means to direct different numbers of pulses through the gate network into the accumulator register input means upon detection of line segments in different dot patterns, said numbers being preselected and associated with particular dot patterns in some desired manner, the control of said detection and association operations being accomplished by said program register in response to said control mark counts associated with said selected dot patterns.

15. The system of claim 14 wherein the dot patterns are disposed in linear arrays on the data medium for the purpose of recording multi-digit numbers, wherein each digit of a multi-digit number is represented by lines between dot pairs in a single separate dot pattern, the aggregate values of said line segments in said dot pattern equalling the face value of said digit, and wherein the control register means includes:
base counting circuit means operative to cause said pulse generating means to emit $b^m$ pulses upon detection of a line segment in a dot pattern corresponding to a digit in a multi-digit number whose value in said number is obtained by multiplying said digit by $b^m$ where $b$ is the base to which the number is written and the exponent $m$ is the integral power of said base corresponding to the rank or position of said digit in said number.

16. The system of claim 5 wherein M identical dot patterns are disposed on the date medium in a linear array for the purpose of writing an M-digit number, each said digit in said number being represented by the line segments within a single dot pattern, wherein $m$, the integral power of the base associated with each said digit is different for each said dot pattern and progresses from $k$ consecutively to a maximum of $M+k-1$ and wherein the value of $k$ is inscribed in a manner substantially the same as for the said number in the special dot patterns set aside for that purpose on the data medium, said system further comprising:

special detection means operatively associated with said program means, said special detection means disposed to detect all lines within the special dot patterns set aside to record $k$ prior to the detection of any line in one of the M identical dot patterns on which said number is inscribed and to transmit whatever value of $k$ is inscribed therein to said program means, said program means thereafter operative jointly with said state register means and said control means to cause the detection means to emit $b^m$ pulses, where $m=i+k-1$, into the accumulator register input means upon detection of a line segment between a dot pair in the $i$th dot pattern, where $i$ is varied by said program means through all integral values from 1 to M inclusive as successive dot patterns amongst the M identical dot patterns are tested for the presence of lines.

17. The system of claim 10 wherein M identical dot patterns are disposed in a linear array on the data medium for the purpose of recording an M-digit number, each said digit in said number being represented by the line segments within a single dot pattern, wherein $m$, the integral power of the base associated with each digit, is different for each said dot pattern and progresses from $k$ consecutively to a maximum of $M+k-1$ and wherein the value of $k$ is inscribed on special dot patterns set aside for the purpose in a manner substantially the same as that used for the said number, said system further comprising:

special electric contact means substantially the same as the other said contact means, said special electric contact means operatively associated with the program means and disposed to make electric contact with all line segments in the special dot patterns, said program means operative to cause the gate network means to direct pulses first to the special electric contact means and from thence to the program means itself whereby $k$ is transmitted to the program means, said program means thereafter operative jointly with said state register means and said control means to cause $b^m$ pulses, where $m=i+k-1$, to be directed by said gate network means to said electric contact means at the $i$th dot pattern in said linear array of such dot patterns, where $i$ is varied by said program means through all integral values from 1 to M inclusive as successive dot patterns amongst the M identical dot patterns are tested for the presence of lines.

18. The system of claim 15 wherein the direction of scan is parallel to the line of the linear arrays of dot patterns on the data medium on which multi-digit numbers may be inscribed, wherein all dot patterns in each separate linear array are scanned by separate scanning means from amongst the plurality of such scanning means, and wherein the gate network means includes:

auxiliary gate network means operatively associated with the program register means, said auxiliary gate network means operative to transmit pulses from only one selected separate scanning means to the accumulator register input means whereby the number inscribed in only one linear array from amongst the plurality of such linear arrays will be read into the accumulator register means.

19. The system of claim 18 wherein M identical dot patterns in each linear array of such dot patterns are reserved for the purpose of recording an M-digit number wherein each said digit of each said number is represented by the line segments within a single dot pattern, wherein $m$, the integral power of the base associated with each said digit, is different for each said dot pattern and progresses from $k$ consecutively to a maximum of $M+k-1$, wherein the value of $k$ is inscribed on special dot patterns in each said linear array set aside for the purpose and not included amongst the M dot patterns for recording the number, said special dot patterns being positioned in the linear array so that they will be scanned by the scanning means prior to the scanning of the M identical dot patterns in which the said number is inscribed, and wherein the auxiliary gate network means is further operative to direct pulse from the scanning means only to the program register means during the scanning of said special dot patterns whereby $k$ is transmitted to said program register means, said program register means being thereafter operative jointly with said control register means, as the scanning of the M identical dot patterns proceeds, to cause said gate network means to direct $b^m$ pulses, where $m=i+k-1$, into the accumulator register input means upon detection of a line in the $i$th dot pattern, said program means further operative to vary $i$ through all integral values from 1 to M inclusive in response to the control mark counts as successive dot patterns amongst the M identical dot patterns are scanned.

20. The system of claim 15 wherein the direction of scan is crosswise to the line of the linear arrays of dot patterns on the data medium on which multi-digit numbers be inscribed, wherein each said dot pattern in each said linear array is scanned by separated scanning means from amongst the plurality of such scanning means, and wherein the gate network means includes:

auxiliary gate network means operatively associated with the program register means, said auxiliary gate network means operative to direct pulses from the detection means to the accumulator register input means only when dot patterns in one selected linear array from amongst the plurality of such linear arrays are being scanned, said auxiliary gate network means further operative to transmit pulses from each separate scanning means consectively to the accumulator register input means, the selection of said linear array, the progression of the reading operation from dot pattern to dot pattern, and the number of pulses transmitted to the accumulator register input means upon the detection of lines in each successive dot pattern being controlled by the program register means in response to the control mark counts.

21. The system of claim 20 wherein M identical dot patterns in each linear array of such dot patterns are reserved for the purpose of recording an M-digit number wherein each said digit of each said number is represented by line segments within a single dot pattern, wherein $m$, the integral power of the base associated with each said digit, is different for each said dot pattern and progresses from $k$ consecutively to a maxium of $M+k-1$, wherein the value of $k$ is inscribed on special dot patterns in each said linear array set aside for the purpose and not included amongst the M identical dot patterns set aside for recording the number, and wherein the scanning means includes:

special scanning means operatively associated with the program register means, said special scanning means being positioned relative to the other scanning means to scan the special dot patterns, said positioning further causing said scanning of the special dot patterns to be accomplished prior to the scanning of the other dot patterns, said special scanning means operable to read whatever value of $k$ is inscribed on the special dot patterns and transmit said value to the program register means, said program register means being thereafter operable jointly with said control register means, as the scanning of the M identical dot patterns proceeds, to cause said pulse generating means to emit $b^m$ pulses, where $m=i+k-1$, into the accumulator register input means upon detection of a line in the $i$th dot pattern, said program register means further operative in response to the control mark counts to vary $i$ through all integral values from 1 to M in response to the control mark counts as successive dot patterns amongst the M identical dot patterns are scanned.

References Cited
UNITED STATES PATENTS

| | | | |
|---|---|---|---|
| 1,117,184 | 11/1914 | Goldberg | 340—146.3 |
| 3,048,327 | 8/1962 | Gewickey et al. | 340—146.3 |
| 3,209,328 | 9/1965 | Bonner | 340—146.3 |

THOMAS A. ROBINSON, Primary Examiner

U.S. Cl. X.R.

340—168